(12) United States Patent
Cooper (10) Patent No.: US 7,997,150 B2
(45) Date of Patent: Aug. 16, 2011

(54) MAGNETIC DRIVE ASSEMBLY FOR PETROLEUM AND LPG METER

(75) Inventor: William Rodney Cooper, Greenwood, SC (US)

(73) Assignee: Itron, Inc., Liberty Lake, WA (US)

( * ) Notice: Subject to any disclaimer, the term of this patent is extended or adjusted under 35 U.S.C. 154(b) by 76 days.

(21) Appl. No.: 12/296,366

(22) PCT Filed: Apr. 6, 2007

(86) PCT No.: PCT/US2007/066161
§ 371 (c)(1),
(2), (4) Date: Jun. 5, 2009

(87) PCT Pub. No.: WO2007/118200
PCT Pub. Date: Oct. 18, 2007

(65) Prior Publication Data
US 2009/0288495 A1    Nov. 26, 2009

Related U.S. Application Data

(60) Provisional application No. 60/790,341, filed on Apr. 7, 2006.

(51) Int. Cl.
*G01F 1/115* (2006.01)
*G01F 1/28* (2006.01)
*G01F 1/05* (2006.01)
*G01F 3/32* (2006.01)
(52) U.S. Cl. ............. 73/861.94; 73/861.88; 73/238; 73/239; 73/861.79; 73/861.74
(58) Field of Classification Search ............... None
See application file for complete search history.

(56) References Cited

U.S. PATENT DOCUMENTS

| | | | |
|---|---|---|---|
| 3,295,370 A * | 1/1967 | Marx | 73/861.94 |
| 3,587,314 A * | 6/1971 | Kullmann | 73/257 |
| 3,662,600 A * | 5/1972 | Rosano et al. | 73/257 |
| RE28,000 E * | 4/1974 | Branitzky | 73/258 |
| 3,802,266 A | 4/1974 | Rittenhouse et al. | |
| 4,461,174 A * | 7/1984 | Han | 73/275 |
| 5,251,480 A | 10/1993 | Brunson, IV et al. | |
| 5,866,824 A * | 2/1999 | Schieber | 73/861.79 |
| 6,065,352 A * | 5/2000 | Schieber | 73/861.79 |
| 6,098,456 A * | 8/2000 | Munck | 73/275 |
| 7,775,422 B2 * | 8/2010 | Winter et al. | 235/200 R |

FOREIGN PATENT DOCUMENTS
FR      925562 A    9/1947
FR    2263496 A1   10/1975
WO  WO 97/11338 A1  3/1999

OTHER PUBLICATIONS

Supplementary European Search Report for EP Application No. 07 76 0262 dated Aug. 6, 2009.
Communication pursuant to Article 94(3) EPC for EP Application No. 07760262.1 issued Dec. 4, 2009.
Communication pursuant to Article 94(3) EPC for EP Application No. 07760262.1 issued Jun. 1, 2010.

* cited by examiner

*Primary Examiner* — Harshad Patel
(74) *Attorney, Agent, or Firm* — Dority & Manning, P.A.

(57) ABSTRACT

A metering system for measuring a flow of petroleum and LPG. In embodiments of the invention, a magnetic drive is used to couple a measuring chamber, such as a known oscillating piston system, to a register or indicator, avoiding leakage and excessive wear due to passing a shaft through the wall of the chamber.

15 Claims, 7 Drawing Sheets

(PRIOR ART)

MAGNETIC DRIVE ASSEMBLY FOR PETROLEUM AND LPG METER

CROSS-REFERENCE TO RELATED APPLICATIONS

This patent application claims the benefit of U.S. Provisional Patent Application No. 60/790,341, filed Apr. 7, 2006, which is hereby incorporated by reference in its entirety.

BACKGROUND OF THE INVENTION

Meters serve important functions in everyday commerce and industry. It is often essential to know what quantity of a substance has been transferred from one place to another. For example, residential water meters indicate how much water has been transferred into a residence, while commercial gasoline pump meters indicate how much gasoline has been transferred into a vehicle. Two important commercial liquid fuels that must be metered in a great number of commercial and industrial contexts include liquid propane gas (LPG) and petroleum and petroleum products and derivatives such as gasoline, diesel, fuel oil, etc.

Unfortunately, these fluids, and especially LPG, pose special handling problems and known metering devices to date for these chemicals have been ineffective and prone to wear and breakage. LPG in particular, for example, is a pressurized material that vaporizes easily when the applied pressure is decreased. Moreover, LPG has very little lubricity, so that it easily escapes past seals and provides little lubrication to the interface between seals and other parts such as shafts. The wear due to lack of lubricity leads to even greater leakage past the seals as the problem compounds itself. The end result is at best inaccuracy and at worst a breakdown of the metering system Although metering system seals, such as between a metering chamber and a register or indicator, are mechanically relatively simple to replace, there are often other considerations that make replacement costly and time consuming. For example, some types of usage scenarios require that the meter be calibrated, verified, and closed by a government agency or entity. Failure of a meter seal in such a scenario requires reopening of the meter, often necessitating that the calibration, verification and closing process be repeated. This often entails delay while waiting for the necessary government officials to travel to the relevant location and perform the needed review. Thus, it is desirable to replace the current breakage prone seals with a system that presents fewer maintenance challenges and allows greater utility of the meter system.

BRIEF SUMMARY OF THE INVENTION

Certain embodiments of the invention relate to a meter for measuring a flow of petroleum and LPG. In embodiments of the invention, a magnetic drive is used to couple a measuring chamber, such as a known oscillating piston system, to a register or indicator. In a preferred embodiment of the invention, the wall of the measuring chamber is comprised of a nonmagnetic material such as stainless steel or aluminum to allow conduction of magnetic flux across the wall.

DETAILED DESCRIPTION OF THE INVENTION

As noted above, fluids such as LPG pose special handling problems, and the metering devices to date for LPG have been ineffective and prone to wear and breakage. In the case of LPG in particular, this attributable to the low viscosity and lubricity of the material. These qualities cause problems for the pass through seals normally used for LPG metering. In particular, these seals involve a rotating shaft that passes from the metering chamber, through a cover, to a register or indicator. A seal is provided where the shaft passes through the cover to attempt to prevent loss from the metering chamber. Such loss results in accuracy and also contaminates the surrounding area. However, given LPG's naturally low viscosity, the shaft seal is frequently not completely effective, even when new, at preventing leakage. Moreover, the lack of lubricity causes the seal to wear quickly, causing even greater leakage and eventually affecting operations to the point that the seal requires replacement.

Figure 6:
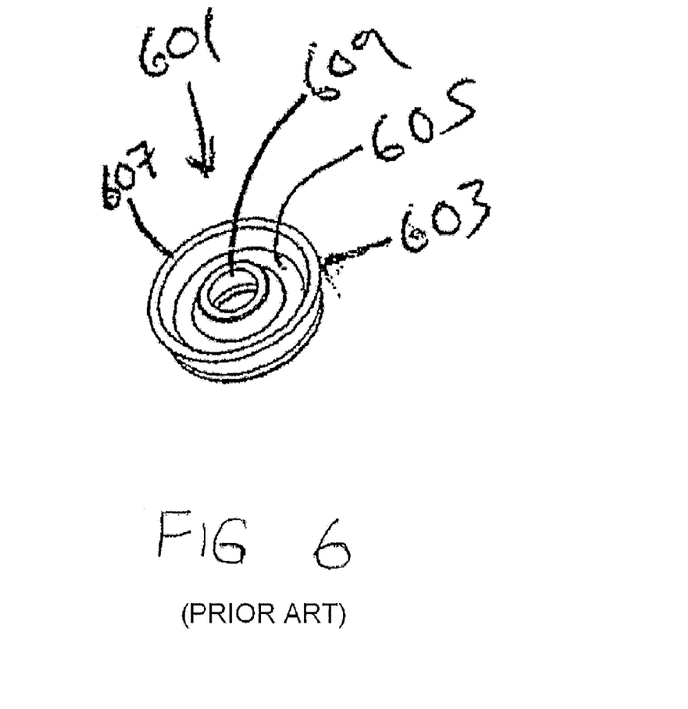
FIG. 6 is a perspective view of a prior art "u-cup" used to seal the output shaft from an LPG measurement chamber.

FIG. 6 is a perspective view of a prior art "u-cup" used to seal the output shaft from an LPG measurement chamber. The u-cup seal 601, which is also used in numerous other devices where shaft sealing is required, comprises an annulus 603 with an annular channel 605. The annulus has a radially outward sealing lip 607 on its outer circumference and a radially inward sealing lip 609 on its inner circumference. The outward sealing lip 607 seals the seal into an opening such as in a meter case. The inward sealing lip 609 typically seals the seal against a shaft, such as between a measurement chamber and a register or indicator. In order to for the seal 601 to function properly, there must be a small gap between the shaft (not shown) and the seal 601. However, the ability of a liquid to breach a gap is dependent upon its viscosity, and LPG has a very low viscosity. Moreover, the lubrication of the joint between the seal 601 and the shaft depends upon the lubricity of the liquid being sealed against. For a low-lubricity material such as LPG, the wear characteristics of the seal 601 will be degraded.

Embodiments of the invention allow for the accurate and reliable metering of LPG and other fluids without posing a risk of leakage around, or excessive degradation of, a shaft seal. In particular, embodiments of the invention provide a contact-less coupling mechanism such that the metering chamber cover need not have a shaft opening at all. In an embodiment of the invention, the meter and a rotary mechanism within the metering chamber are each fitted with a multi-pole magnetic disc. The first multi-pole magnetic disc, associated with the metering chamber, rotates as fluid passes through the chamber. The second multi-pole magnetic disc, associated with the meter itself, is in proximity to the first multi-pole magnetic disc across the metering chamber cover.

The metering chamber cover is preferably comprised of a non-magnetic material that is also sturdy and relatively impervious to the fluids being metered. In an embodiment of the invention, the metering chamber cover is made of aluminum or an aluminum alloy, cast and/or machined to the appropriate shape. The thickness of the metering chamber cover in the vicinity of the magnetic discs is preferably such that the discs are in close proximity to one another, such that the overlapping flux between them causes them to rotate together. In this way, when the magnetic disc associated with the metering chamber rotates in response to fluid flow, the magnetic disc associated with the register or indicator also rotates with it in a fixed mechanical relationship due to the magnetic interaction between the discs.

Embodiments of the invention will be further described in greater detail hereinafter by reference to the drawings. Although the flowing embodiments of the invention will be described by reference to a positive displacement metering mechanism, and in particular an oscillating piston mechanism, it will be appreciated by those of skill in the art given the disclosure herein that the invention is not limited to this type of metering mechanism.

Figure 1:
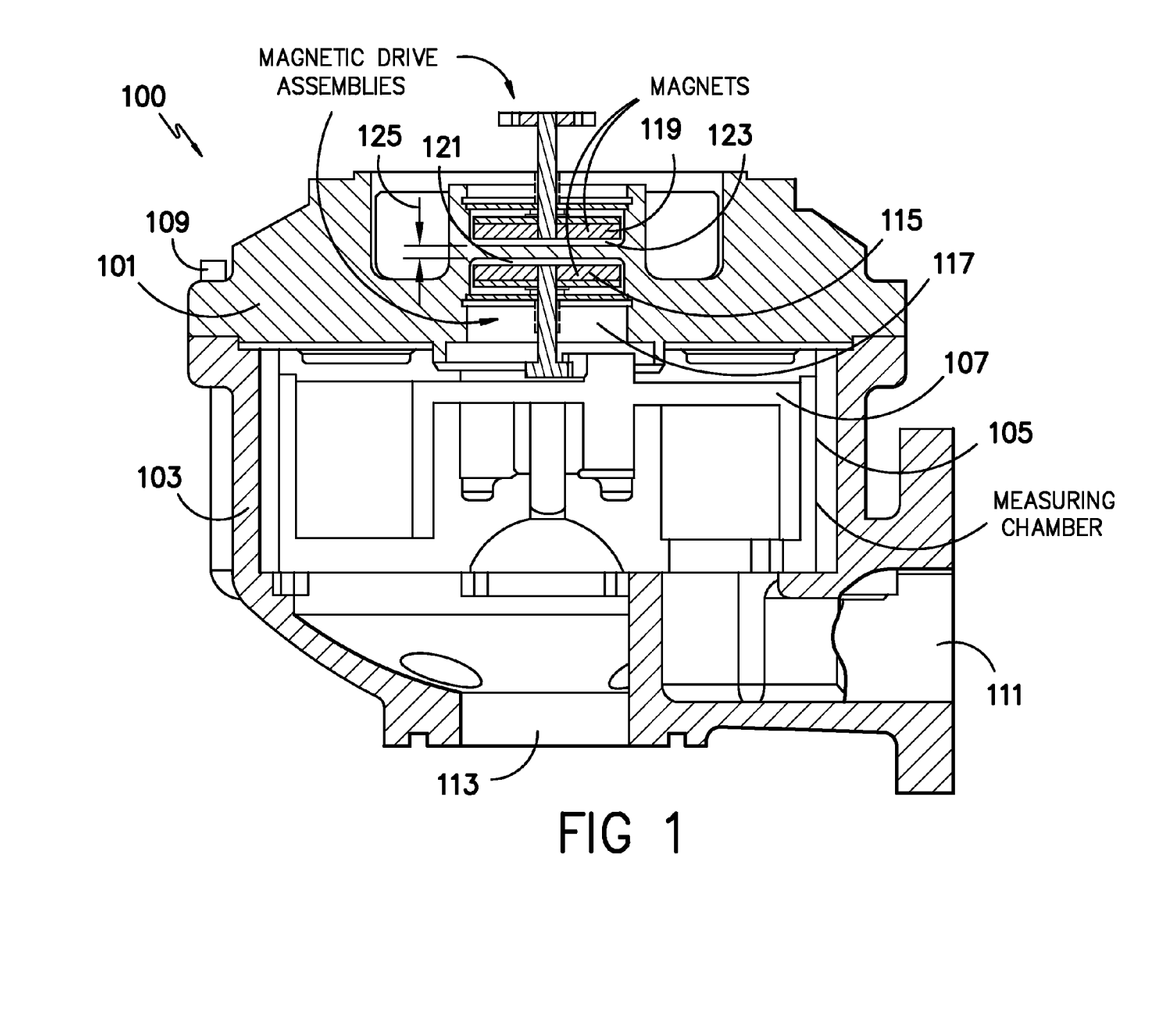
FIG. 1 is a cross-sectional side view of a chamber, meter, and drive according to an embodiment of the invention.

FIG. 1 is a cross-sectional side view of a meter assembly, i.e., a chamber, meter, and drive, according to an embodiment of the invention. The assembly comprises, in greater detail, a cover 101 and a base 103. The cover 101 and base 103 are shaped such that they fit together as shown to form a measuring chamber 105. Preferably, the cover 101 and base 103 are held firmly together such as by bolts or clamps, such as bolt 109 and other bolts not shown. In an embodiment of the invention, when the cover 101 and base 103 are together, the measuring chamber 105 has at least one fluid inlet 113 and at least one fluid outlet 111, but no other openings into the chamber. For example, there is no hole for a shaft to exit the chamber.

A rotary measuring element 107 is positioned within the chamber 105. In this example, the measuring element 107 is an oscillating piston which is favored for its positive displacement characteristics, but other types of metering element, positive displacement or otherwise, may be used alternatively. For example, nutating discs, vanes, turbines and other mechanisms may be used. All of these measurement elements produce a rotary motion that is related to the rate of flow past the element. Because the chamber 105 is closed except for the inlet 113 and outlet 111, a mechanism is needed to transfer the rotary motion of the measuring element through the case to an external register or indicator.

In an embodiment of the invention, the rotating output of the oscillating piston 107 is in contact with a shaft fixed to a magnetic disc 115. The cover 101 may comprise a cylindrical depression 117 for locating the magnetic disc at a fixed gap 121 from the cover 101. Outside of the chamber 105 on the opposite side of the cover 101, a second magnetic disc 119 is fixed a predetermined gap 123 from the cover, again such as by a depression, bracket etc. and is allowed to rotate relative to the cover 101. The distance spanned by the gaps 121, 123 and the thickness 125 of the cover 101 between the magnetic discs 115, 119 comprises a flux gap across which the flux lines of the two magnetic discs 115, 119 interact. A flux gap of about 0.3 inches has been found to work well, although lesser or greater gaps may be utilized depending upon the component sizes and types used. With respect to the magnetic discs, any suitable magnetic disc of a fewer or greater number of poles than shown, or of a different configuration or composition may be used as will be appreciated by those of skill in the art.

An oscillating piston mechanism is described hereinafter by way of example. FIGS. 2A-2D show an oscillating piston assembly in various stages of rotation, as can be used in an embodiment of the invention. The oscillating piston assembly comprises a chamber 201 for containing a piston 203. The piston 203 is constrained by a fixed diaphragm 205 slidably located in a slot 207 in the piston 203, and also by a chamber piston pivot 211. The piston pivot 211 is offset from a chamber shaft 209 at a center of rotation, and an arm or other element rotatably connects the pivot to the shaft 209 at the center of rotation. As the shaft 209 rotates on center, the piston 203 rotates eccentrically within the chamber 201.

Figure 2A:
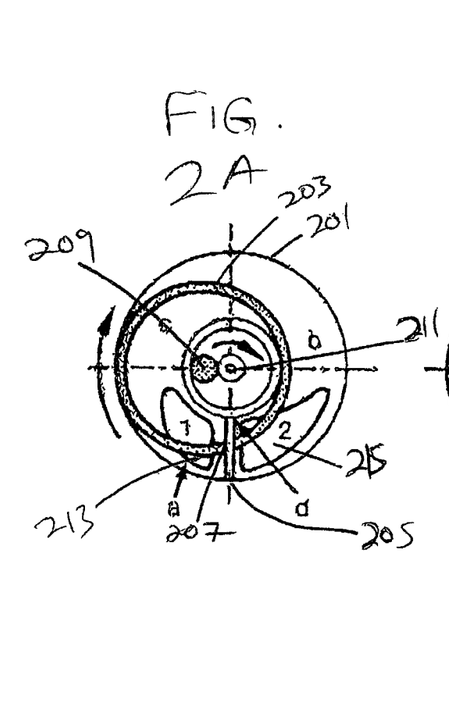
FIG. 2A shows an oscillating piston assembly as can be used in an embodiment of the invention in an initial stage of rotation.
Figure 2B:
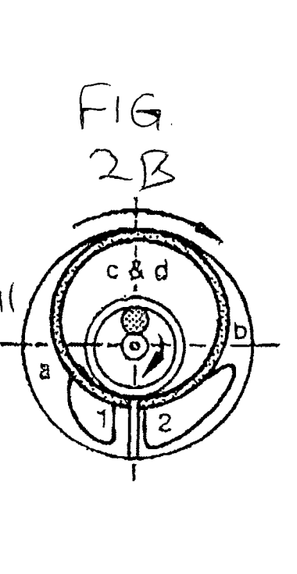
FIG. 2B shows an oscillating piston assembly as can be used in an embodiment of the invention in a second stage of rotation.
Figure 2C:
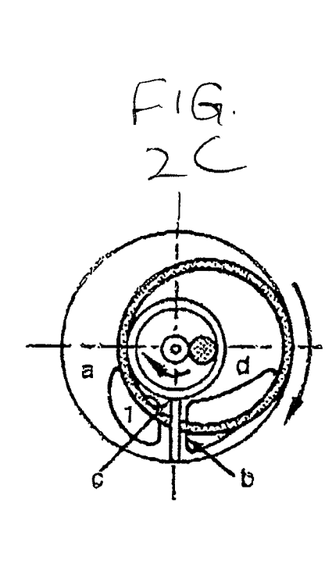
FIG. 2C shows an oscillating piston assembly as can be used in an embodiment of the invention in a third stage of rotation.
Figure 2D:
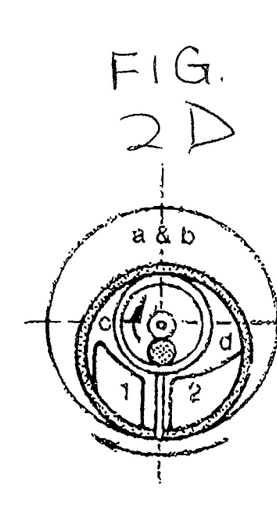
FIG. 2D shows an oscillating piston assembly as can be used in an embodiment of the invention in a final stage of rotation.

In operation, referring to FIG. 2A, when fluid at pressure is introduced into the chamber 201 via an inlet 213, the piston 203 is pushed upward and clockwise in the configuration shown. At the same time, any fluid residing on the opposite side of the piston 203 in communication with outlet 215 is pushed toward an out of the outlet 215. As the process continues, the volume filled by incoming fluid increase and the space filled by outgoing fluid decreases. FIG. 2B shows the condition when the two volumes are equal. As the piston 203 continues clockwise, the space filled by incoming fluid exceeds the space filled by outgoing fluid as shown in FIG. 2C. Finally, the piston 203 returns to a position where it no longer divides the interior space of the chamber separately from the diaphragm 205. As this process continues, the piston 203 continues to rotate at a rate directly proportional to the flow of fluid through the apparatus, i.e., into the inlet 213 or out of the outlet 215.

Figures 3A, 3B:
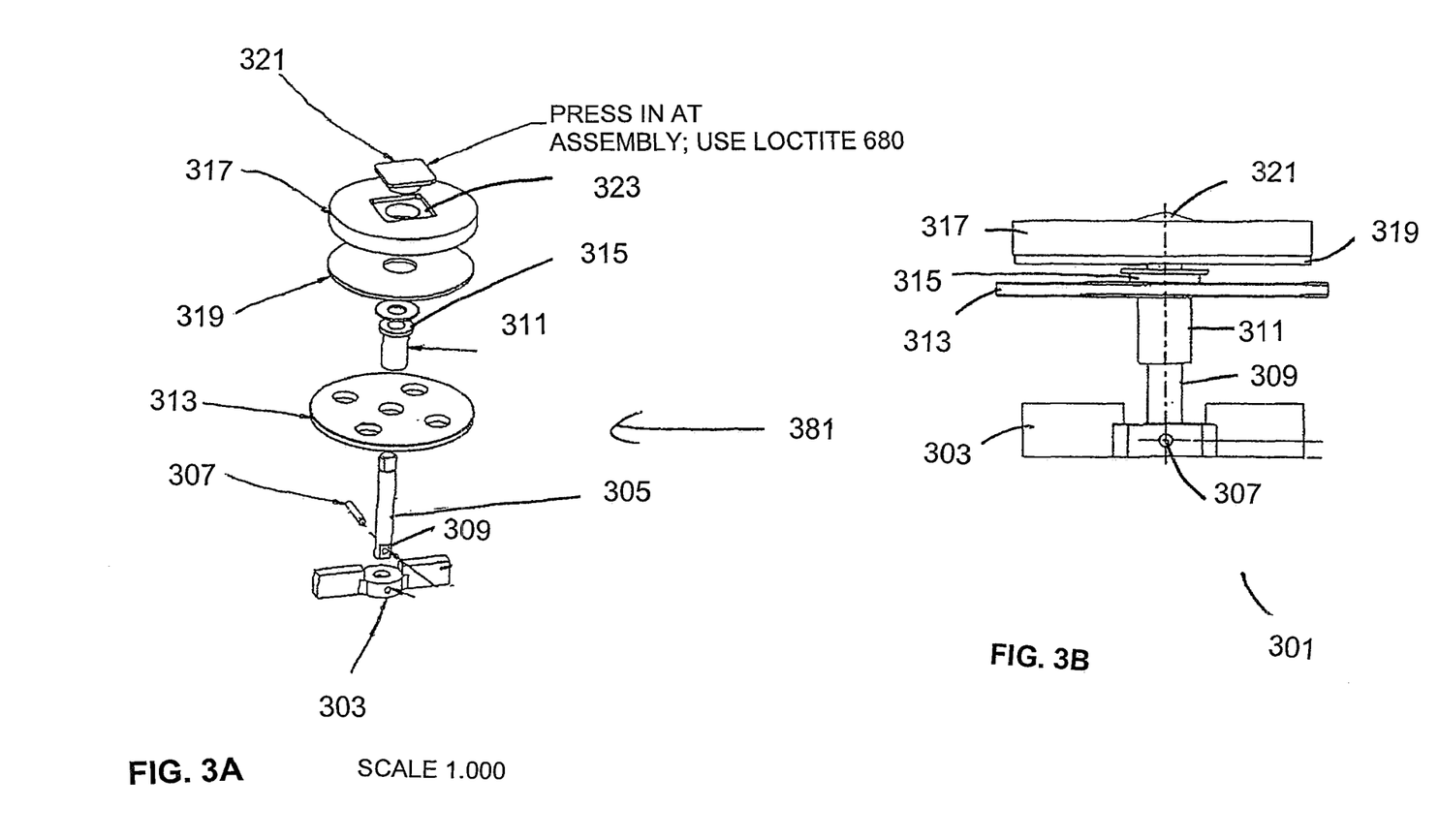
FIG. 3A is a perspective view of the internal magnetic drive assembly.
FIG. 3B is a side view of the internal magnetic drive assembly.

Having discussed the overall configuration of the device and the measurement system according to an embodiment of the invention, the mechanisms associated with the retention, positioning, and use of the magnetic discs will now be discussed in greater detail. FIG. 3A is a perspective view of the internal magnetic drive assembly, i.e., the portion of the drive that resides within the measurement chamber 105. The internal magnetic drive assembly 301 comprises a drive arm 303 connected to an internal drive shaft 305. The drive arm 303 is held to the internal drive shaft 305 via a press fit pin 307 in an embodiment of the invention. Although in this embodiment of the invention the pin 307 may keep the arm 303 and shaft 305 in registration, a flat 309 on the shaft cooperating with a land (not shown) in the arm 303 may also or alternatively be used.

A bearing 311 is placed over the top of the shaft via a press fit or otherwise, capturing on it retention plate 313. An outcropping shoulder 315 on the bearing 311 prevents the retention plate 313 from coming off of the shaft 305. The shaft 305 and bushing 311 assembly, when held in place within the measurement chamber, as will be described below, acts as a foundation to support the other components of the assembly 301. The disc 317 has been described above in greater detail. A flux concentrator (magnet backing plate) 319 is positioned on the same side of the disc 317 as the recess for receiving the shoulder 315.

The backing plate 319 is preferably of a ferrous material such as iron or several types of stainless steel, and is held to the magnetic disc 317 by magnetic attraction. The backing plate 319 serves a number of functions, chief among them to concentrate the flux of the magnetic disc 317 such that a greater magnetic force is provided at the opposite surface of the disc 317. Another benefit potentially supplied by the backing plate 319 is to reduce flux leakage into the remainder of the measurement chamber, although this is not important in many applications.

Finally, a nonmetallic insert 321 is press fit into the top of the drive assembly 301 via a recess 323 in the top of the magnetic disc 317. The insert 321 serves to provide a bearing surface between the disc 317 and the proximate surface of the inside of the measurement chamber cover. The serves a function of friction reduction and wear resistance as well as of maintaining a proper disc-to-surface gap. The insert can be made of any suitable material, but plastic materials such as polypropylene, ETFE, and others provide ideal mechanical durability, lubricity, invulnerability to most chemicals and liquids, as well as manufacturing ease and economy. In an embodiment of the invention, the insert 321 is comprised of polyphenylene sulfide with mixed glass (30%) and tetrafluoroethylene (15%). The shape of the insert 321 can be better seen in FIG. 3B, to be discussed below.

FIG. 3B is a side view of the internal magnetic drive assembly 301, wherein like reference numerals designate like components. The side view shows the components of the internal magnetic drive assembly 301, including the drive arm 303 connected to the internal drive shaft 305 via pin. The bearing 311 is shown on the shaft 305, capturing the retention plate 313 via shoulder 315. The figure also shown in side view the magnetic disc 317 and the flux concentrator (magnet backing plate) 319 beneath the disc 317. Finally, the nonmetallic insert 321 can be seen press fit into the top of the magnetic disc 317. In this view, it can be seen that the surface of the insert 321 rises above the top surface of the disc 317 and provides a bearing surface between the disc 317 and the inside of the measurement chamber.

As discussed above, the magnetic drive system comprises an internal drive that is flux coupled through the case of the measurement chamber to an external drive. The internal drive has been described with respect to FIGS. 3A and 3B. Hereinafter, the external drive will be described in greater detail by reference to FIGS. 4A and 4B.

Figure 4A:
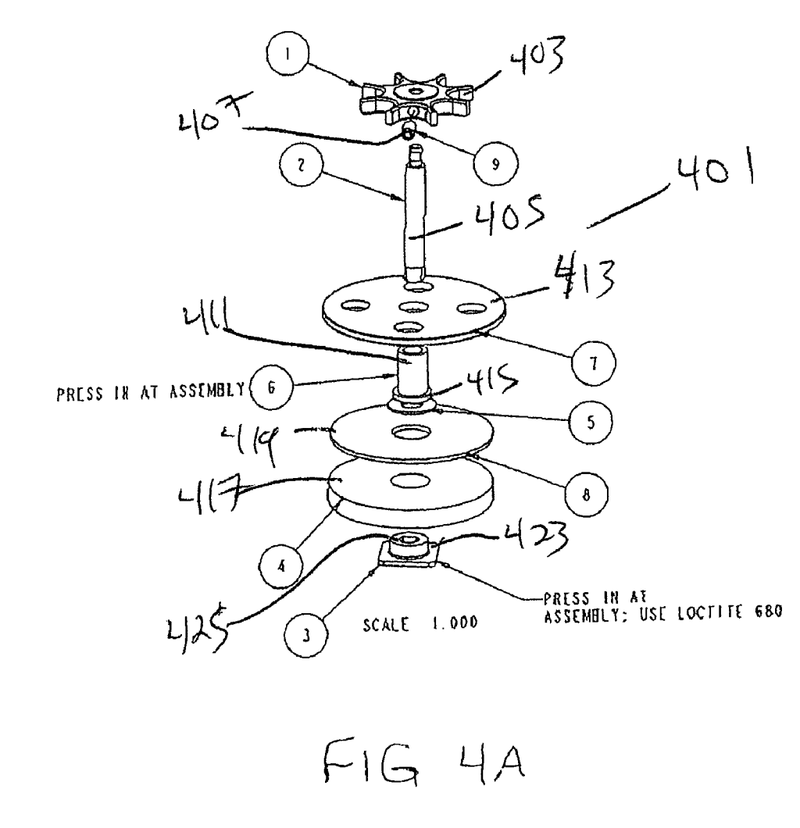
FIG. 4A is a perspective view of the external magnetic drive assembly.

FIG. 4A is a perspective view of the external magnetic drive assembly, i.e., the portion of the drive that resides outside the measurement chamber 105, i.e., element 125 of FIG. 1. The external magnetic drive assembly 401 comprises a drive star 403 connected to a drive shaft 405. In an embodiment of the invention, the drive star 403 is held to the drive shaft 405 via a set screw 407, optionally in cooperation with a flat or depression formed on the shaft 405.

As with the in internal drive, a bearing 411 is press fit or otherwise attached to the retention plate 413 on the shaft 405. A shoulder 415 on the bearing 411 prevents the retention plate 413 from coming off of the shaft 405. The shaft 405 and bushing 411 assembly, when held in place against the outside of the measurement chamber opposite the internal drive supports the remaining components of the assembly 401. As with the internal drive, the shoulder 415 is press fit into 413. In an embodiment of the invention, a circlip or truarc clip may be placed under the shoulder 415 of the bearing 411 to decrease the tolerance between the assembly (especially insert 423) and the cover when operating.

The disc 417 may be of the same type and configuration as that used for the internal drive, and in any case it preferably has the same number of poles as the internal disc 317 although such is not mandatory. A flux concentrator 419 is positioned on the same side of the disc 417 as the bearing 411. The backing plate 319 the same type and configuration as that used for the internal drive.

Finally, as with the internal drive, a nonmetallic insert 423 is press fit into the top of the drive assembly 401 via a recess (not shown) in the top of the magnetic disc 417 for receiving a protrusion 425 on the insert 423. The insert 423 serves to provide a bearing surface between the disc 417 and the proximate surface of the outside of the measurement chamber for friction reduction and wear resistance as well as to maintain a proper disc-to-surface gap. The insert 423 can be made of the same material and configuration as the internal insert 323.

Figure 4B:
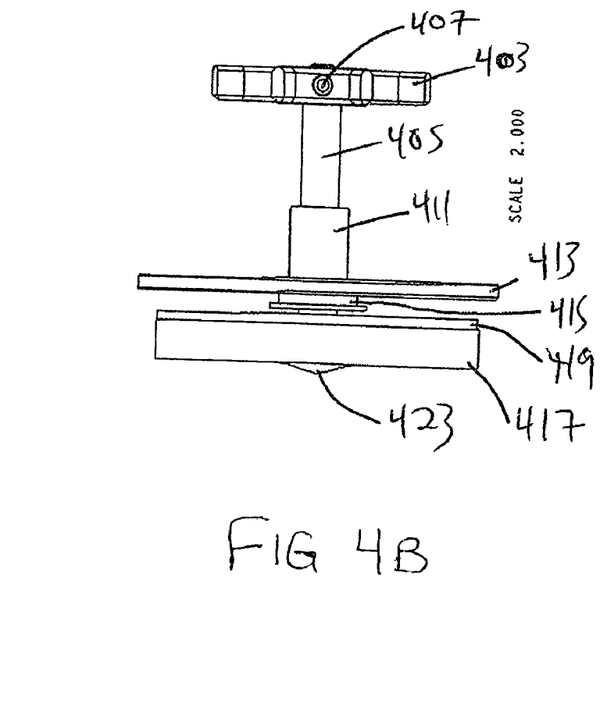
FIG. 4B is a side view of the external magnetic drive assembly.

FIG. 4B is a side view of the external magnetic drive assembly 401, wherein like reference numerals designate like components. The side view shows the components of the external magnetic drive assembly 401, including the drive star 403 connected to the drive shaft 405 via set screw 407. The bearing 411 is shown with the shaft 405, capturing the retention plate 413 via shoulder 415. The figure also shows in side view the magnetic disc 417 and the flux concentrator 419 beneath the disc 417. Finally, the nonmetallic insert 423 is shown fit into the bottom of the magnetic disc 417. Although it is not shown in this view, as with the internal assembly 301 the surface of the insert 423 extends beyond the surface of the disc 417 and provides a bearing surface between the disc 417 and the outside of the measurement chamber.

Figure 5A:
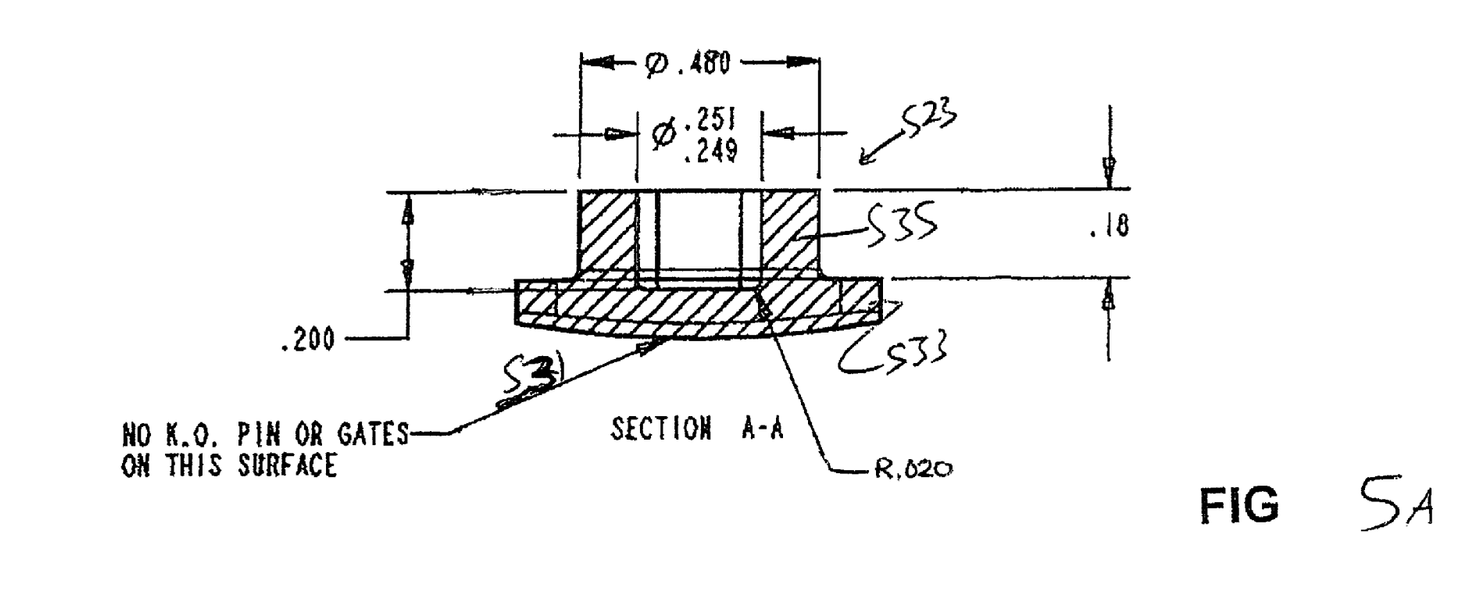
FIG. 5A is a cross-sectional side view of a magnetic disc insert according to an embodiment of the invention.
Figure 5B:
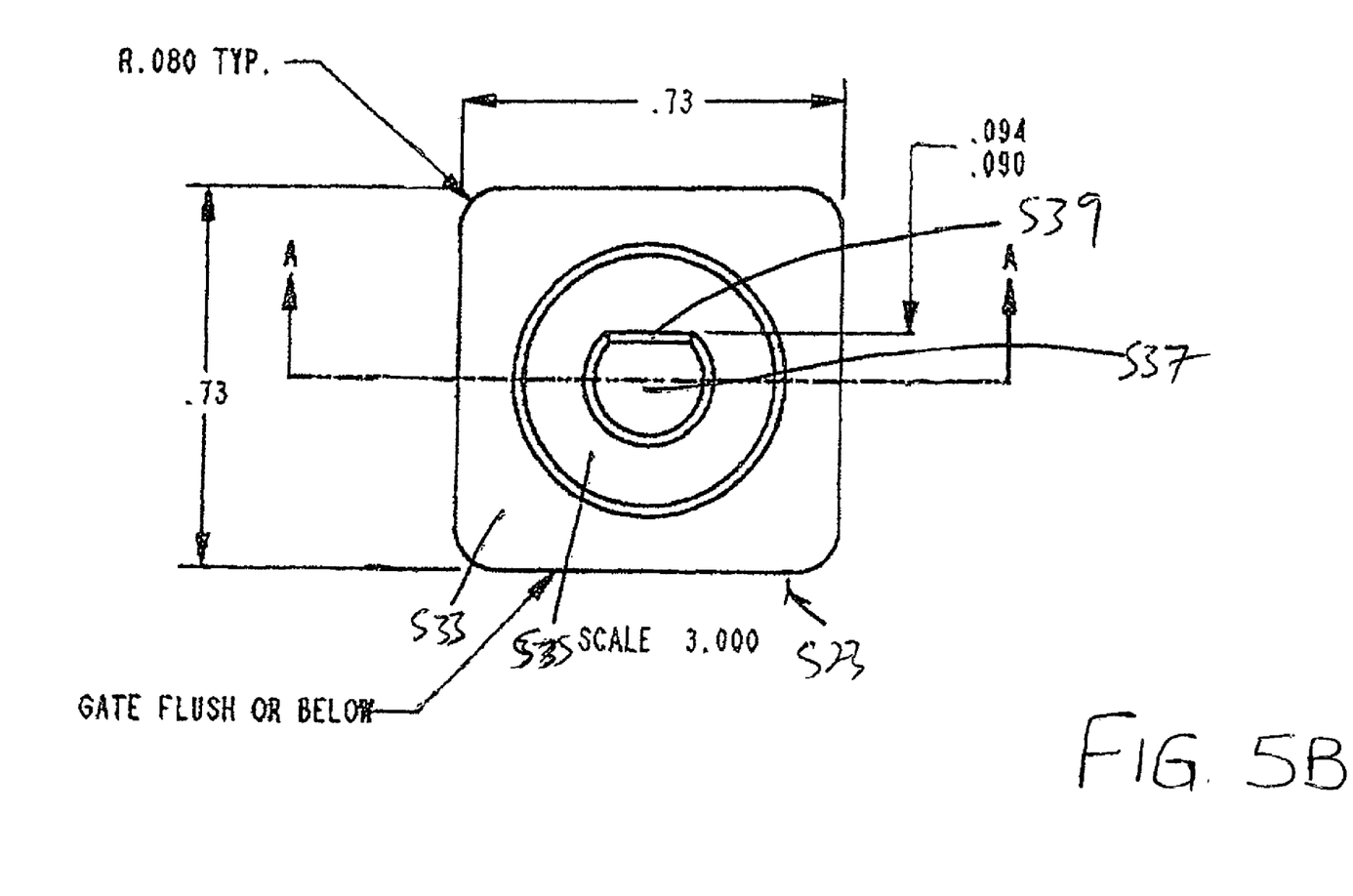
FIG. 5B is a bottom plan view of a magnetic disc insert according to an embodiment of the invention.

FIGS. 5A and 5B show the insert 321, 423 in greater detail. Referring to FIG. 5A, this figure is a cross-sectional side view of the insert 321, 423, labeled as 523 in the present figure. As noted above, the insert 523 may be of any suitable material, but in an embodiment of the invention the insert 523 in comprised of polyphenylene sulfide with mixed glass (30%) and tetrafluoroethylene (15%). It can be seen that the insert 523 comprises a bearing surface 531. In addition, the insert 523 comprises a head 533 and a trunk 535. The trunk 535 fits into an opening in a magnetic disc and centers the insert 523 on the disc. The head 533 rests against the disc, either at the upper surface or within a shallow recess, and keeps the insert 523 from slipping further into the disc when pressure is applied to the bearing surface 531.

FIG. 5B is a bottom plan view of the insert 523. This view shows the head 533 in greater detail so that the shape may be appreciated. In this embodiment of the invention, the head 533 is of an essentially square shape, having rounded corners, but any other shape may be used alternatively. The view of FIG. 5B also shows the trunk 535 being of generally circular cross-section in keeping with an embodiment of the invention. The trunk 535 includes a central recess 537 for receiving the end of shaft 305, 405. The recess 537 may have a land 539 to cooperate with a matching flat on shaft 305, 405 to prevent rotation of the insert 523, and hence of the magnetic disc (via the cooperation of the head 533 and the recess on the disc).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A meter assembly for the accurate and reliable metering of LPG and other petroleum-based fluids without posing a risk of leakage around, or excessive degradation of, a shaft seal, comprising:
   a chamber having a respective cover and base configured for collectively forming a sealed measuring chamber, and having at least one fluid inlet and at least one fluid outlet but no other openings into the chamber
   a rotary measuring element positioned within said chamber for producing a rotary motion that is related to the rate of flow past the element
   an internal magnetic drive assembly positioned within said chamber, and including a shaft coupling between said rotary measuring element, and an internal magnetic disc;
   a first cylindrical depression formed by said cover for receiving and locating said internal magnetic disc at a predetermined gap from said cover;
   an external magnetic drive assembly within said cover but positioned outside said chamber, and including an external magnetic disc;
   a second cylindrical depression formed by said cover for receiving and locating said external magnetic disc at a predetermined gap from said cover;
   wherein said first cylindrical depression and said second cylindrical depression are separated by a portion of said cover having a thickness; and
   whereby a predetermined flux gap is formed between said internal and external magnetic discs so that interacting flux lines between said discs form a fixed mechanical relationship between said discs.

2. A meter assembly as in claim 1, wherein said predetermined flux gap is generally less than 0.5 inches.

3. A meter assembly as in claim 2, wherein said predetermined flux gap is generally about 0.3 inches.

4. A meter assembly as in claim 1, wherein said magnetic discs respectively comprise multi-pole magnetic discs.

5. A meter assembly as in claim 1, where said measuring element includes one of an oscillating piston, a nutating disc, a vane, and a turbine.

6. A meter assembly as in claim 1, where said chamber cover comprises a nonmagnetic material.

7. A meter assembly as in claim 1, wherein said internal magnetic drive assembly includes a drive arm connected to said shaft thereof held to such shaft with a press fit pin.

8. A meter assembly as in claim 7, further including a bearing and retention plate for capturing an end of said shaft.

9. A meter assembly as in claim 1, wherein said internal magnetic drive assembly further includes a flux concentrator received adjacent said internal magnetic disc.

10. A meter assembly as in claim 9, wherein said flux concentrator comprises a ferrous material held to said internal magnetic disc by magnetic attraction.

11. A meter assembly as in claim 1, further including a nonmetallic insert associated with said internal magnetic drive assembly for maintaining said internal magnetic disc at said predetermined gap thereof from said cover.

12. A meter assembly as in claim 1, wherein said external magnetic drive assembly further includes an output shaft connected to said external magnetic disc, and rotatably driven thereby, said output shaft configured for connection with a metering device.

13. A meter assembly as in claim 12, further including a bearing and retention plate for capturing an end of said output shaft.

14. A meter assembly as in claim 1, further including a nonmetallic insert associated with said external magnetic drive assembly for maintaining said external magnetic disc at said predetermined gap thereof from said cover.

15. A meter assembly as in claim 1, further including a pair of nonmetallic inserts, respectively associated with said internal and said external magnetic drive assemblies, for respectively maintaining said internal and external magnetic discs at said predetermined flux gap.

* * * * *